US012169238B2

(12) United States Patent
Chen et al.

(10) Patent No.: US 12,169,238 B2
(45) Date of Patent: Dec. 17, 2024

(54) ENHANCED RADAR RECOGNITION FOR AUTOMATED VEHICLES

(71) Applicant: Ford Global Technologies, LLC, Dearborn, MI (US)

(72) Inventors: Xingping Chen, Troy, MI (US); Jeremy Lerner, Southfield, MI (US); Danielle Rosenblatt, Dearborn, MI (US); Andrew Edward Toy, Northville, MI (US); Ali Abdallah, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 424 days.

(21) Appl. No.: 17/481,467

(22) Filed: Sep. 22, 2021

(65) Prior Publication Data

US 2023/0088573 A1 Mar. 23, 2023

(51) Int. Cl.
*G01S 13/931* (2020.01)
*B60W 30/14* (2006.01)
(Continued)

(52) U.S. Cl.
CPC ......... *G01S 13/931* (2013.01); *B60W 30/143* (2013.01); *B60W 30/18163* (2013.01);
(Continued)

(58) Field of Classification Search
CPC ...... G01S 13/931; G01S 7/411; G01S 13/584; G01S 13/72; G01S 2013/932; G01S 2013/9321; G01S 2013/9329; G01S 7/415; G01S 7/4095; G01S 2013/93271; B60W 30/143; B60W 30/18163; B60W 2420/52; B60W 2754/10; B60W 2754/20; B60W 2754/30; B60W 2754/40; B60W 2754/50; B60W 2754/60; B60W 2754/70; B60K 28/00; B60K 2028/003; B60K 2028/006; B60K 28/02; B60K 28/04; B60K 28/06; B60K 28/063; B60K 28/066; B60K 28/08;
(Continued)

(56) References Cited

U.S. PATENT DOCUMENTS

| 10,914,813 | B2 | 2/2021 | Dang et al. | |
| 2020/0207358 | A1* | 7/2020 | Katz | G02B 27/0093 |
| 2022/0094070 | A1* | 3/2022 | Harle | G01S 13/931 |

FOREIGN PATENT DOCUMENTS

| CN | 111198377 A | 5/2020 |
| DE | 102020108389 A1 * | 9/2021 |

(Continued)

*Primary Examiner* — Vladimir Magloire
*Assistant Examiner* — Remash R Guyah
(74) *Attorney, Agent, or Firm* — Frank A. Mackenzie; Bejin Bieneman PLC

(57) ABSTRACT

A system comprises a computer having a processor and a memory, the memory storing instructions executable by the processor to access sensor data of a sensor of a vehicle while an adaptive cruise control feature of the vehicle is active, detect, based on the sensor data, an object located along a path of travel of the vehicle, determine that the object is a moveable object based on a radar return of a radar reflector of the object, and responsive to the determination that the object is the moveable object, adjust, by the adaptive cruise control feature, the speed of the vehicle.

18 Claims, 8 Drawing Sheets

(51) Int. Cl.
*B60W 30/18* (2012.01)
*G01S 7/41* (2006.01)
*G01S 13/58* (2006.01)
*G01S 13/72* (2006.01)

(52) U.S. Cl.
CPC ............ *G01S 7/411* (2013.01); *G01S 13/584* (2013.01); *G01S 13/72* (2013.01); *B60W 2420/408* (2024.01); *B60W 2754/10* (2020.02); *G01S 2013/932* (2020.01); *G01S 2013/9321* (2013.01); *G01S 2013/9329* (2020.01)

(58) Field of Classification Search
CPC ........ B60K 28/10; B60K 28/12; B60K 28/14; B60K 28/16; B60K 28/165; G05D 1/0061; G05D 1/0088; G05D 1/021; G05D 1/0214; G05D 1/0221; G05D 1/0223
USPC .......................................................... 342/70
See application file for complete search history.

(56) References Cited

FOREIGN PATENT DOCUMENTS

| | | | |
|---|---|---|---|
| JP | 2005098897 A * | 4/2005 | |
| WO | 200241448 A1 | 5/2002 | |
| WO | WO-2018236215 A1 * | 12/2018 | ........... H01Q 1/1228 |
| WO | 2020122777 A1 | 6/2020 | |
| WO | WO-2021046797 A1 * | 3/2021 | |

* cited by examiner

FIG. 6

Storage Medium 600

Computer-Executable Instructions for 500

ENHANCED RADAR RECOGNITION FOR AUTOMATED VEHICLES

BACKGROUND

Adaptive cruise control is a vehicle feature that, when engaged, controls vehicle propulsion power/acceleration in order to maintain a set speed when possible, while monitoring the road in front of the vehicle in order to detect other vehicles that may be present. When the adaptive cruise control feature detects the presence of a slower-moving vehicle in front of the controlled vehicle, it can temporarily reduce the speed of the controlled vehicle below the set speed in order to maintain a desired minimum following distance. Subsequently, if the adaptive cruise control feature detects that the road in front of the vehicle has become clear, it can cause the vehicle to accelerate back up to the set speed.

BRIEF DESCRIPTION OF THE DRAWINGS

FIG. 6 is a block diagram of an example storage medium.

DETAILED DESCRIPTION

Figure 1:
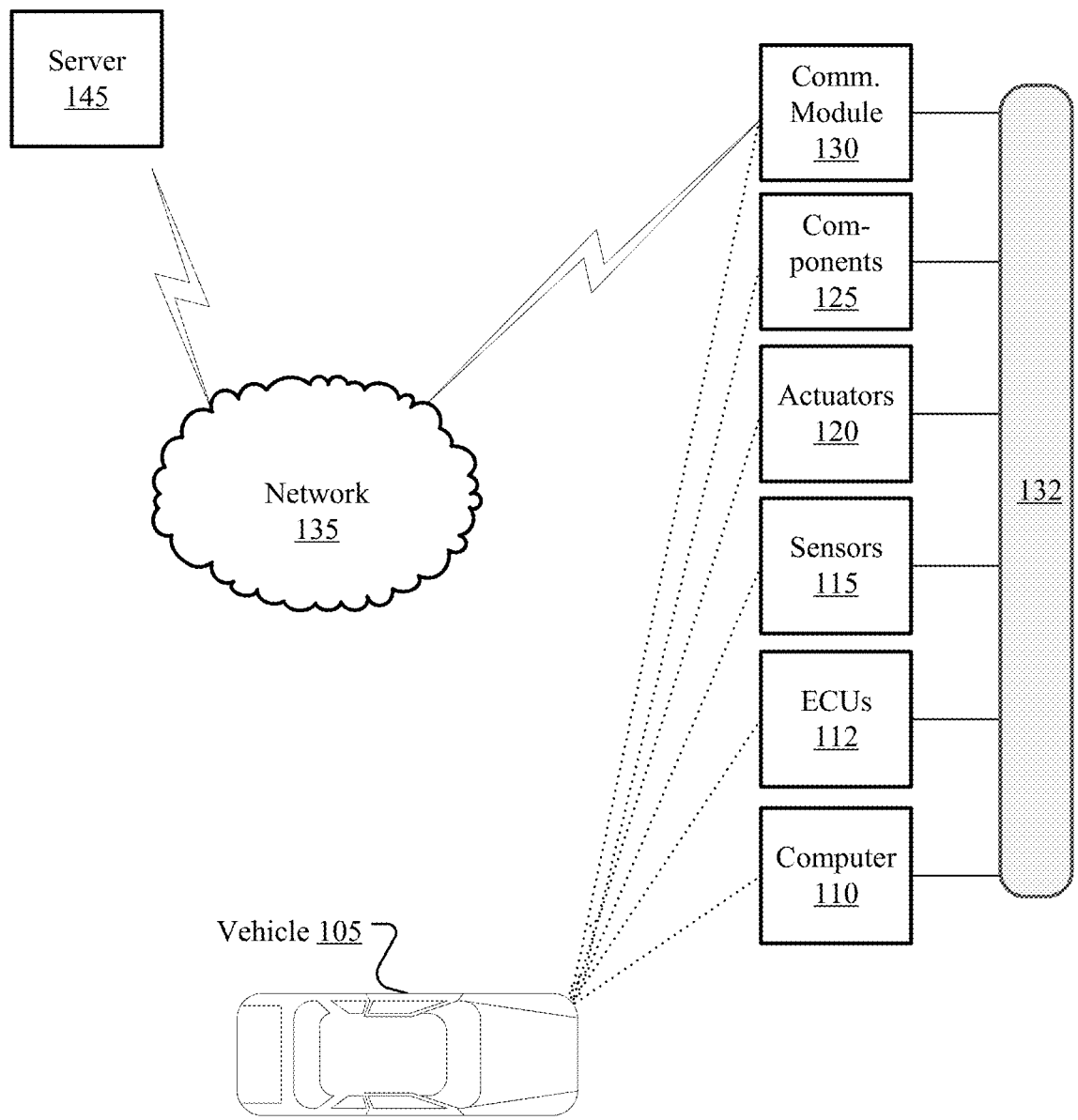
FIG. 1 is a block diagram of a first example system.

Disclosed herein are adaptive cruise control improvements according to which a host vehicle can be equipped with a radar reflector that rotates while the host vehicle is stopped (or moving at below a threshold speed). The design of the radar reflector can be chosen to produce radar returns with characteristics that trailing vehicles will interpret as an indication that the object to which the radar reflector is attached is a movable object. An adaptive cruise control feature of a trailing vehicle can treat such an indication as a secondary confirmation of an initial conclusion that a detected object is a movable object. This can allow the adaptive cruise control feature to take action further in advance, with respect to both distance and time, in response to the presence of the host vehicle.

A system can comprise a computer having a processor and a memory, the memory storing instructions executable by the processor to access sensor data of a radar sensor of a vehicle while an adaptive cruise control feature of the vehicle is active, detect, based on the sensor data, an object located along a path of travel of the vehicle, determine that the object is a moveable object based on a radar return of a radar reflector of the object, and responsive to the determination that the object is the moveable object, adjust, by the adaptive cruise control feature, the speed of the vehicle.

The radar reflector can comprise a corner reflector.

The memory can store instructions executable by the processor to detect rotation of the radar reflector based on the radar return of the radar reflector and determine that the object is the moveable object responsive to detecting the rotation of the radar reflector.

The memory can store instructions executable by the processor to determine that the object is the moveable object based on a rate of the rotation of the radar reflector.

The memory can store instructions executable by the processor to determine a reflectivity of the radar reflector based on the radar return of the radar reflector and determine that the object is the moveable object based on the reflectivity of the radar reflector.

The memory can store instructions executable by the processor to detect, based on the sensor data, a second object located along a path of travel of the vehicle and determine that the second object is a non-moveable object based on a radar return of a second radar reflector of the second object.

The memory can store instructions executable by the processor to determine that the second object is the non-moveable object based on a reflectivity of the second radar reflector.

The memory can store instructions executable by the processor to detect rotation of the second radar reflector based on the radar return of the second radar reflector and determine that the second object is the non-moveable object based on a rate of the rotation of the second radar reflector.

The memory can store instructions executable by the processor to detect rotation of the radar reflector based on the radar return of the radar reflector, determine a rate of rotation of the radar reflector, and determine that the moveable object is a disabled vehicle based on the rate of rotation of the radar reflector.

The memory can store instructions executable by the processor to cause the vehicle to execute a lane change responsive to the determining that the moveable object is the disabled vehicle.

A method can comprise accessing sensor data of a radar sensor of a vehicle while an adaptive cruise control feature of the vehicle is active, detecting, based on the sensor data, an object located along a path of travel of the vehicle, determining that the object is a moveable object based on a radar return of a radar reflector of the object, and responsive to the determination that the object is the moveable object, adjusting, by the adaptive cruise control feature, the speed of the vehicle.

The radar reflector can comprise a corner reflector.

The method can comprise detecting rotation of the radar reflector based on the radar return of the radar reflector and determining that the object is the moveable object responsive to detecting the rotation of the radar reflector.

The method can comprise determining that the object is the moveable object based on a rate of the rotation of the radar reflector.

The method can comprise determining a reflectivity of the radar reflector based on the radar return of the radar reflector and determining that the object is the moveable object based on the reflectivity of the radar reflector.

The method can comprise detecting, based on the sensor data, a second object located along a path of travel of the vehicle and determining that the second object is a non-moveable object based on a radar return of a second radar reflector of the second object.

The method can comprise determining that the second object is the non-moveable object based on a reflectivity of the second radar reflector.

The method can comprise detecting rotation of the second radar reflector based on the radar return of the second radar reflector and determining that the second object is the non-moveable object based on a rate of the rotation of the second radar reflector.

The method can comprise detecting rotation of the radar reflector based on the radar return of the radar reflector, determining a rate of rotation of the radar reflector, and determining that the moveable object is a disabled vehicle based on the rate of rotation of the radar reflector.

The method can comprise causing the vehicle to execute a lane change responsive to the determining that the moveable object is the disabled vehicle.

FIG. 1 is a block diagram of a first example system 100. The system 100 includes a host vehicle 105, which is a land vehicle such as a car, truck, etc. The vehicle 105 includes a computer 110, electronic control units (ECUs) 112, vehicle sensors 115, actuators 120 to actuate various vehicle components 125, a communications module 130, and a vehicle network 132.

Communications module 130 allows vehicle 105 to communicate with a server 145 via a network 135.

The computer 110 includes a processor and a memory. The memory includes one or more forms of computer-readable media, and stores instructions executable by the processor for performing various operations, including as disclosed herein. The processor can be implemented using any suitable processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor, or any other suitable microprocessor or central processing unit (CPU). The processor also can be implemented as a dedicated processor, such as a controller, a microcontroller, an embedded processor, a chip multiprocessor (CMP), a co-processor, a graphics processor, a graphics processing unit (GPU), a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In some implementations, computer 110 can include multiple processors, each one of which can be implemented according to any of the examples above.

The computer 110 may operate vehicle 105 in an autonomous, a semi-autonomous mode, or a non-autonomous (manual) mode, i.e., can control and/or monitor operation of the vehicle 105, including controlling and/or monitoring components 125. For purposes of this disclosure, an autonomous mode is defined as one in which each of vehicle propulsion, braking, and steering are controlled by the computer 110; in a semi-autonomous mode the computer 110 controls one or two of vehicle propulsion, braking, and steering; in a non-autonomous mode a human operator controls each of vehicle propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may be communicatively coupled to, e.g., via vehicle network 132 as described further below, one or more processors located in other device(s) included in the vehicle 105. Further, the computer 110 may communicate, via communications module 130, with a navigation system that uses the Global Position System (GPS). As an example, the computer 110 may request and receive location data of the vehicle 105. The location data may be in a conventional format, e.g., geo-coordinates (latitudinal and longitudinal coordinates).

ECUs 112 (which can also be referred to as electronic control modules (ECMs) or simply as "control modules") are computing devices that monitor and/or control various vehicle components 125 of vehicle 105. Examples of ECUs 112 can include an engine control module, a transmission control module, a powertrain control module, a brake control module, a steering control module, and so forth. Any given ECU 112 can include a processor and a memory. The memory can include one or more forms of computer-readable media, and can store instructions executable by the processor for performing various operations, including as disclosed herein. The processor of any given ECU 112 can be implemented using a general-purpose processor or a dedicated processor or processing circuitry, including any of the examples identified above in reference to a processor included in computer 110.

In some implementations, the processor of a given ECU 112 can be implemented using a microcontroller. In some implementations, the processor of a given ECU 112 can be implemented using a dedicated electronic circuit including an ASIC that is manufactured for a particular operation, e.g., an ASIC for processing sensor data and/or communicating the sensor data. In some implementations, the processor of a given ECU 112 can be implemented using an FPGA, which is an integrated circuit manufactured to be configurable by an occupant. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of general-purpose processor(s), ASIC(s), and/or FPGA circuits may be included in a given ECU 112.

Vehicle network 132 is a network via which messages can be exchanged between various devices in vehicle 105. Computer 110 can be generally programmed to send and/or receive, via a vehicle network 132, messages to and/or from other devices in vehicle 105 (e.g., any or all of ECUs 112, sensors 115, actuators 120, components 125, communications module 130, a human machine interface (HMI), etc.). Additionally or alternatively, messages can be exchanged among various such other devices in vehicle 105 via vehicle network 132. In cases in which computer 110 actually comprises a plurality of devices, vehicle network 132 may be used for communications between devices represented as computer 110 in this disclosure. Further, as mentioned below, various controllers and/or vehicle sensors 115 may provide data to the computer 110.

In some implementations, vehicle network 132 can be a network in which messages are conveyed via a vehicle communications bus. For example, vehicle network can include a controller area network (CAN) in which messages are conveyed via a CAN bus, or a local interconnect network (LIN) in which messages are conveyed via a LIN bus.

In some implementations, vehicle network 132 can include a network in which messages are conveyed using other wired communication technologies and/or wireless communication technologies (e.g., Ethernet, WiFi, Bluetooth, etc.). Additional examples of protocols that may be used for communications over vehicle network 132 in some implementations include, without limitation, Media Oriented System Transport (MOST), Time-Triggered Protocol (TTP), and FlexRay.

In some implementations, vehicle network 132 can represent a combination of multiple networks, possibly of different types, that support communications among devices in vehicle 105. For example, vehicle network 132 can include a CAN in which some devices in vehicle 105 communicate via a CAN bus, and a wired or wireless local area network in which some device in vehicle 105 communicate according to Ethernet or Wi-Fi communication protocols.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles), etc., relative to the location of the vehicle 105. The vehicle sensors 115 may further include camera sensor(s) 115, e.g., front view, side view, rear view, etc., providing images from a field of view inside and/or outside the vehicle 105.

Actuators 120 are implemented via circuitry, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via communication module 130 with devices outside of the vehicle 105, e.g., through vehicle-to-vehicle (V2V) or vehicle-to-infrastructure (V2X) wireless communications to another vehicle, to (typically via the network 135) a remote server 145. The communications module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth®, IEEE 802.11, dedicated short range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC) and cellular V2V (CV2V), cellular V2X (CV2X), etc.), local area networks (LAN) and/or wide area networks (WAN), including the Internet, providing data communication services.

Computer 110 can receive and analyze data from sensors 115 substantially continuously, periodically, and/or when instructed by a server 145, etc. Further, object classification or identification techniques can be used, e.g., in a computer 110 based on lidar sensor 115, camera sensor 115, etc., data, to identify a type of object, e.g., vehicle, person, rock, pothole, bicycle, motorcycle, etc., as well as physical features of objects.

Figure 2:
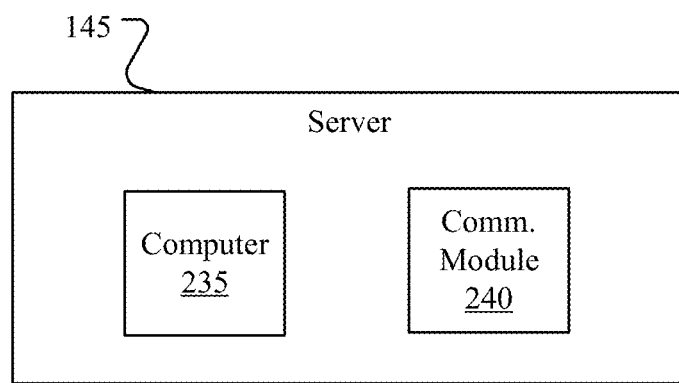
FIG. 2 is a block diagram of an example server.

FIG. 2 is a block diagram of an example server 145. The server 145 includes a computer 235 and a communications module 240. The computer 235 includes a processor and a memory. The memory includes one or more forms of computer-readable media, and stores instructions executable by the computer 235 for performing various operations, including as disclosed herein. The communications module 240 can include conventional mechanisms for wired and/or wireless communications, e.g., radio frequency communications using suitable protocols, that allow computer 235 to communicate with other devices, such as the vehicle 105, via wireless and or wired communication networks/links.

Figure 3A:
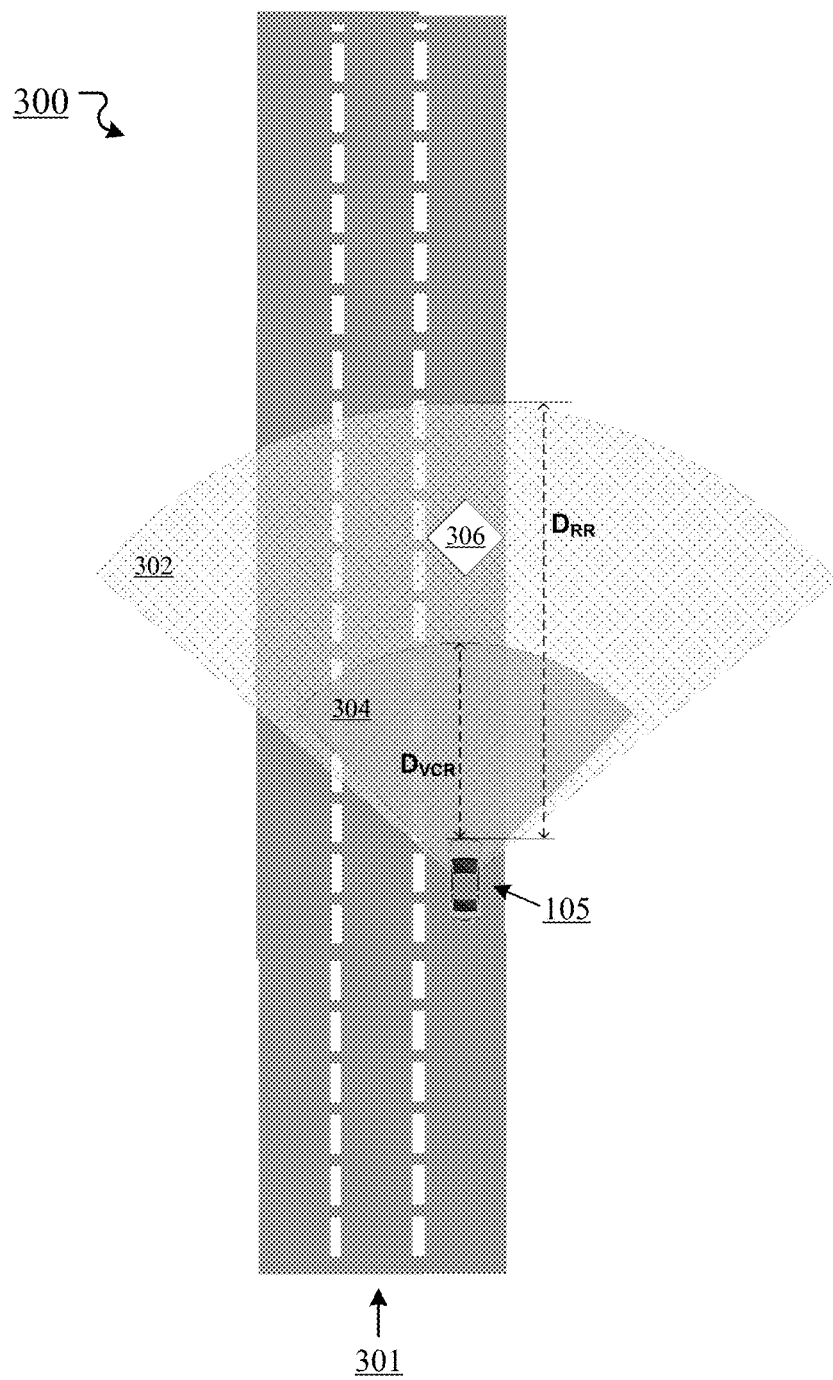
FIG. 3A is a diagram of a first example traffic scene.

FIG. 3A is a diagram of a first example traffic scene 300. In traffic scene 300, while an adaptive cruise control feature of vehicle 105 is engaged, vehicle 105 travels a roadway 301. This can be while computer 110 operates vehicle 105 in an autonomous mode, a semi-autonomous mode, or a non-autonomous (manual) mode, as discussed above in reference to FIG. 1. While engaged, the adaptive cruise control feature of vehicle 105 can control vehicle propulsion power/acceleration in order to maintain a set speed when possible, while monitoring the road in front of vehicle 105 in order to detect other vehicles that may be present. When the adaptive cruise control feature detects the presence of a vehicle in front of vehicle 105, it can determine whether vehicle 105, if it continues to travel at the set speed, will approach to within a desired minimum following distance from the detected vehicle. If so, the adaptive cruise control feature can temporarily reduce the speed of vehicle 105 below the set speed in order to prevent it from approaching any closer than the desired minimum following distance.

In some implementations, the adaptive cruise control feature of vehicle 105 can use data provided by multiple sensors of vehicle 105 in order to detect the presence of other vehicles on roadway 301. In some implementations, for example, the adaptive cruise control feature can use data provided by a first sensor of a first type and a second sensor of a second type. In such an implementation, if the ranges of the two sensors differ, the adaptive cruise control feature may initially detect an object using data of the sensor having the greater range and formulate a preliminary conclusion regarding the nature of the detected object. Once the detected object is within range of the sensor having the lesser range, the adaptive cruise control feature may be able to use data of that sensor to confirm its preliminary conclusion.

FIG. 3A depicts a particular example in which the first sensor is a radar sensor of vehicle 105 and the second sensor is a camera of vehicle 105. Using radar sensing data provided by the radar sensor, radar-based object detection functionality of vehicle 105 (e.g., radar-based object detection functionality provided by computer 110 or an ECU 112) can detect objects (such as other vehicles) within a radar range 302 that extends a distance $D_{RR}$ forward from the front of vehicle 105. Using images captured by the camera, image-based object detection functionality of vehicle 105 (e.g., image-based object detection functionality provided by computer 110 or an ECU 112) can visually detect/recognize objects (such as other vehicles) within a visual confirmation range 304. Visual confirmation range 304, which is smaller than radar range 302, extends a distance $D_{VCR}$ forward from the front of vehicle 105, where $D_{VCR}$ is less than $D_{RR}$.

In this example, the adaptive cruise control feature of vehicle 105 can be configured to obtain visual confirmation that objects detected via radar actually constitute obstacles in the travel path of vehicle 105 prior to performing adaptive cruise control state adjustments (e.g., deceleration) in response to the detection of such objects. As employed herein, the term "visual confirmation" means confirmation (of a hypothesis) that is realized via processing/analysis of captured images. When radar-based object detection functionality of vehicle 105 detects an object, image-based object detection functionality of vehicle 105 can provide visual confirmation of a hypothesis that the object is an obstacle in the travel path of vehicle 105 by analyzing captured images to determine whether they contain evidence of an object in the travel path of vehicle 105 that is consistent with the radar sensing data that served as the basis for the radar-based detection of the object.

In traffic scene 300, an object 306—which may represent another vehicle or may represent some other object—is located along the travel path (the right lane of roadway 301) of vehicle 105. Object 306 is located within radar range 302 of vehicle 105, and thus can be detected using radar. However, object 306 is located outside of visual confirmation range 304. Thus, the adaptive cruise control feature of vehicle 105 cannot visually confirm that object 306 constitutes an obstacle in the travel path of vehicle 105 (as opposed to, e.g., an overpass, low-clearance bridge, or other structure above roadway 301, or objects on or near the roadway, such as a bridge support pillar). If it is required to obtain visual confirmation before adjusting adaptive cruise control parameters, the adaptive cruise control feature of vehicle 105 will not react to the presence of object 306 until vehicle 105 advances to within camera range of object 306.

Requiring visual confirmation of the presence and identity/nature of radar-detected objects before adjusting adaptive cruise control parameters (e.g., reducing vehicle speed) to account for such objects can beneficially impact adaptive cruise control performance. For instance, radar returns from stationary objects in the vicinity of the roadway (e.g., guardrails, bridges, overpasses, etc.) can falsely suggest the presence of vehicles/obstacles on the roadway itself. In such cases, requiring visual confirmation can avoid unnecessary/inappropriate state adjustments (e.g., unnecessary deceleration/braking) that might otherwise result.

Figure 3B:
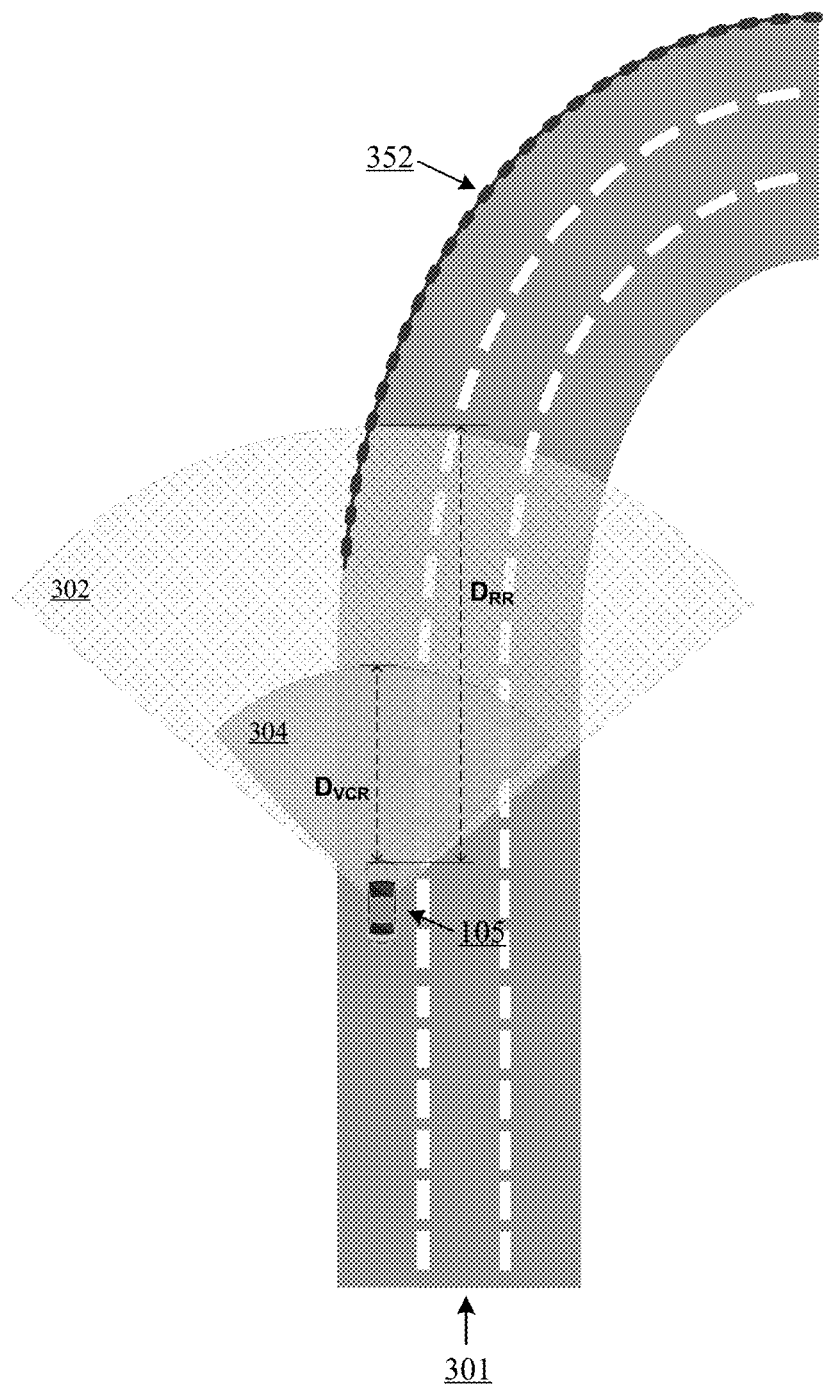
FIG. 3B is a diagram of a second example traffic scene.

FIG. 3B is a diagram of a second example traffic scene 350, in which requiring visual confirmation may beneficially impact adaptive cruise control performance. In traffic scene 350, while its adaptive cruise control feature is engaged, vehicle 105 travels the left lane of roadway 301, and approaches a rightward curve in roadway 301. A guardrail 352 is installed along the left side of roadway 301 in the portion of roadway 301 that comprises the rightward curve. A closest portion of the guardrail 352 is located within radar range 302 of vehicle 105, and may cause radar returns indicating the potential presence of an obstacle in the travel path of vehicle 105. If the adaptive cruise control feature of vehicle 105 is permitted to adjust adaptive cruise control parameters based on those radar returns, without visual confirmation, it may result in undesired behavior, e.g., unnecessarily cause vehicle 105 to decelerate when its travel path is in fact clear. Requiring visual confirmation can enable the adaptive cruise control feature to correctly conclude that no obstacle is actually present in the travel path, and refrain from such unnecessary deceleration.

Although requiring visual confirmation can beneficially impact performance in many situations, such a requirement can potentially have a negative impact on adaptive cruise control performance in certain scenarios. For instance, when stationary objects (e.g., stopped vehicles) are present on the roadway itself, requiring visual confirmation can negatively impact performance by hampering the adaptive cruise control feature's ability to timely adapt to the presence of those stationary objects.

Figure 3C:
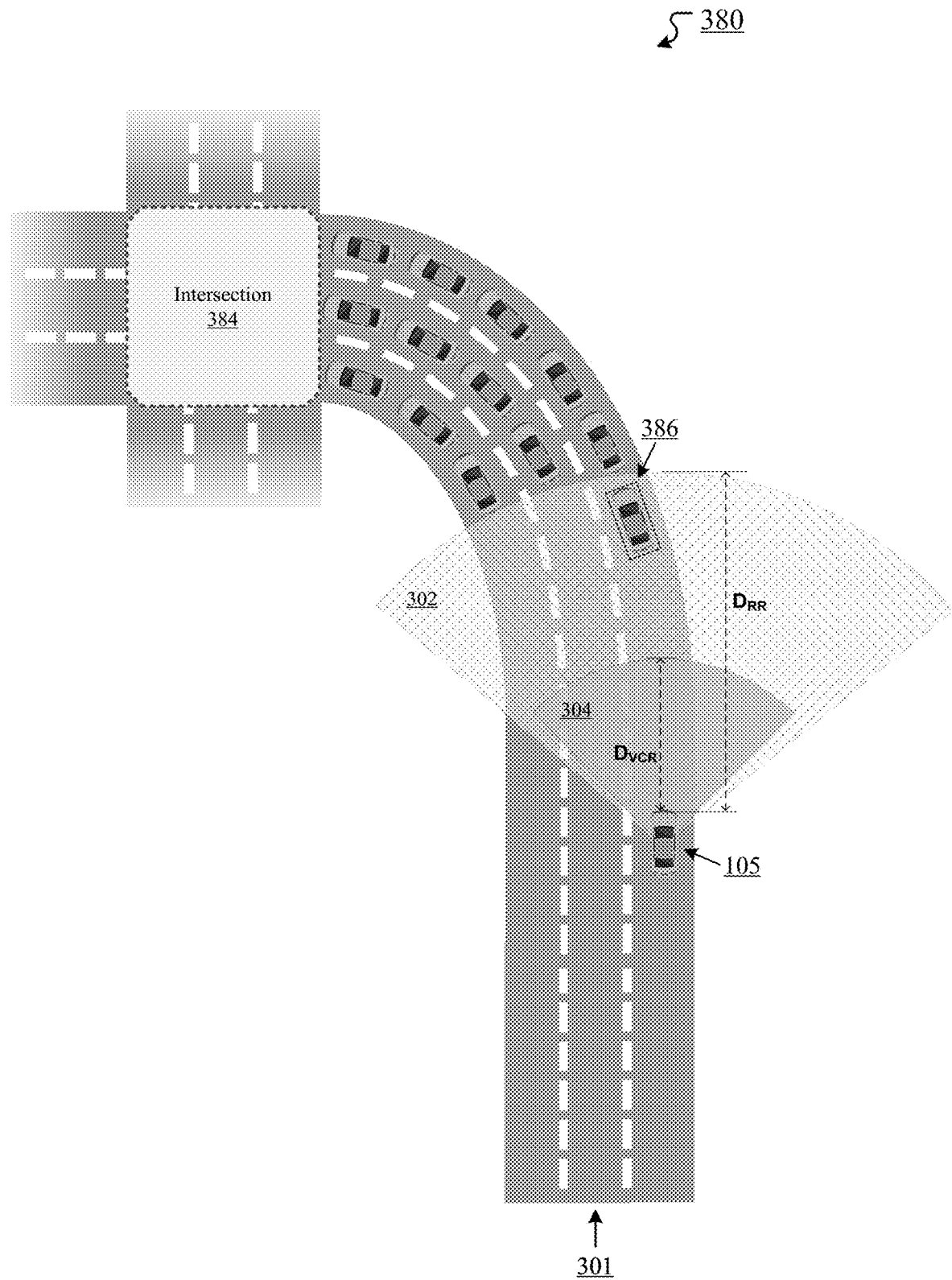
FIG. 3C is a diagram of a third example traffic scene.

FIG. 3C is a diagram of a third example traffic scene 380, which depicts an example of such a scenario. In traffic scene 380, while its adaptive cruise control feature is engaged, vehicle 105 travels the right lane of roadway 301, and approaches an intersection 384 that is preceded by a leftward curve in roadway 301. As employed herein, the term "intersection" means a region of overlap between/among multiple roadways. In the portion of roadway 301 immediately preceding intersection 384, all three lanes are congested with stopped vehicles waiting to traverse intersection 384. The rearmost stopped vehicle in the right lane is a vehicle 386. Vehicle 386 is within radar range 302 of vehicle 105. Based on radar returns from vehicle 386, radar-based object detection functionality of vehicle 105 may detect the presence of a stationary object that potentially constitutes an obstacle in the travel path of vehicle 105. However, vehicle 386 is outside of the visual confirmation range 304 of vehicle 105. Thus, at the present position of vehicle 105, its adaptive cruise control feature may be unable to obtain visual confirmation that the detected stationary object (vehicle 386) actually constitutes an obstacle in the travel path of vehicle 105.

If the adaptive cruise control feature of vehicle 105 is required to obtain such visual confirmation prior to adjusting adaptive control parameters (e.g., causing vehicle 105 to decelerate), it may be unable to take action until vehicle 105 advances to within distance $D_{VCR}$ of vehicle 386 (such that vehicle 386 is within visual confirmation range 304 of vehicle 105). By that time, uncomfortable, harsh, or even drastic deceleration/braking may be necessary in order to maintain a desired minimum following distance/separation from vehicle 386. Thus, in the context of traffic scene 380, it may be preferable that the adaptive cruise control feature not be required to obtain visual confirmation. However, in the context of many scenarios, such as that reflected in traffic scene 350 of FIG. 3B, the absence of a requirement for visual confirmation of initial radar-based object detections may degrade adaptive cruise control performance.

Disclosed herein are adaptive cruise control improvements according to which secondary confirmation of initial radar-based object detections can be non-visual. Host vehicles can be equipped with radar reflectors that create radar returns that trailing vehicles will recognize as indicating the presence of moveable objects. The recognition of such an indication can serve as confirmation of a hypothesis, founded on radar-based detection of the object that is the host vehicle itself, that an obstacle is present in the travel path of the recognizing vehicle.

Figure 4:
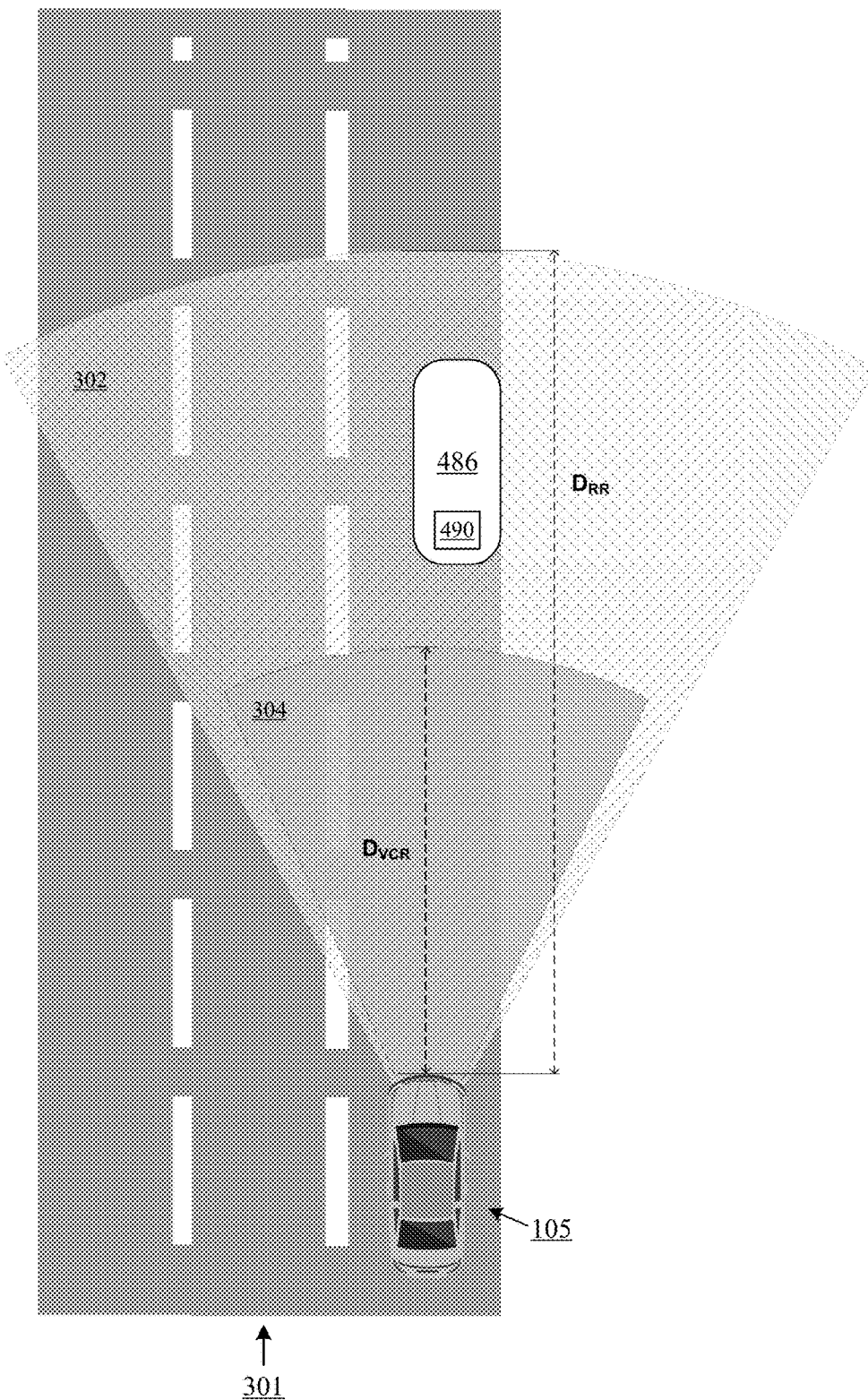
FIG. 4 is a diagram of a fourth example traffic scene.

FIG. 4 is a diagram of a fourth example traffic scene 400. In traffic scene 400, while the adaptive cruise control feature of vehicle 105 is engaged, vehicle 105 travels roadway 301. An object 486—which is assumed, for the purpose of this example, to be a stopped vehicle—is located along the travel path (the right lane of roadway 301) of vehicle 105. Object 486 is located within radar range 302 of vehicle 105, and thus can be detected using radar. However, the adaptive cruise control feature of vehicle 105 may not know directly from this radar-based detection whether object 486 is positioned on the road (constituting an obstacle in the travel path of vehicle 105) or not. Further, since object 486 is located outside of visual confirmation range 304, the adaptive cruise control feature of vehicle 105 cannot visually confirm a hypothesis that object 486 is an obstacle in the travel path of vehicle 105.

If object 486 is a moveable object (which, in this example, it is—a vehicle), it is likely that it is an obstacle on the road, and thus an obstacle in the travel path of vehicle 105. Thus, the adaptive cruise control feature of vehicle 105 can infer that object 486 is an obstacle in the travel path of vehicle 105 if object 486 is a movable object. However, since object 486 (a stopped vehicle) is not moving, the radar-based detection of object 486 does not reveal to the adaptive cruise control feature of vehicle 105 the fact that object 486 is in fact a moveable object.

To facilitate its detection, by trailing vehicles, as a moveable object, object 486—that is, the vehicle that object 486 represents (hereinafter, the "host vehicle")— can be outfitted with a radar reflector 490. Radar reflector 490 is an apparatus that reflects radar waves back towards their source in a manner that results in distinctive and/or recognizable effects in the radar returns received at the source. Radar reflector 490 can be designed to exhibit a high degree of reflectivity and correspondingly large radar cross section, so that it stands out in observed radar returns. In some implementations, radar reflector 490 can comprise one or more corner radar reflectors. In some implementations, radar reflector 490 can be mounted on a rear surface of the host vehicle. In some implementations, the host vehicle can be outfitted with multiple radar reflectors, including radar reflector 490. In some implementations, the multiple radar reflectors can include radar reflectors mounted on front and/or side surfaces of the host vehicle.

The presence of radar reflector 490 causes vehicle 105 to see radar returns with characteristic(s) that it understands as indicating that the object to which radar reflector 490 is attached (object 486) is a moveable object. In some implementations, radar reflector 490 can be designed to exhibit a particular reflectivity, and the adaptive cruise control feature of vehicle 105 can be configured to recognize that particular reflectivity as an indication of a moveable object. In some implementations, radar reflector 490 can rotate, and can do so at a speed that the adaptive cruise control feature of vehicle 105 is configured to recognize as an indication of a moveable object.

In some implementations, a scheme can be implemented according to which the reflectivity or rate of rotation or other movement of radar reflector 490 can be selected to indicate one of multiple possible states of the host vehicle. In such an implementation, the scheme can specify multiple reflectivities or rates of rotation or other movement, each one of which represents an indication of a respective one of the multiple possible states. In an example, the host vehicle can cause radar reflector 490 to rotate at a first rate in order to provide an indication to trailing vehicles (e.g., vehicle 105) that the host vehicle is stopped and likely to remain stopped for an extended period of time (e.g., if the host vehicle is disabled and not able to move), and can cause radar reflector 490 to rotate at a second rate in order to provide an indication that the host vehicle is stopped but likely to being moving relatively soon.

In some implementations, the rotation (or another type of movement) of radar reflector 490 can be triggered when the host vehicle stops, or slows to below a threshold speed. In some implementations, rotation or other movement of radar reflector 490 can additionally or alternatively be triggered by application of brakes of the host vehicle (e.g., when a brake pedal is pressed). In some such implementations, the rotation or other movement can begin when the brakes are applied and continue until the application of the brakes ends (e.g., when the brake pedal is no longer being pressed). In other implementations, the rotation or other movement can continue for a set amount of time following a brake application, regardless of whether the brakes remain applied or not until that set amount of time has elapsed. In some implementations, the rotation or other movement can continue for at least a set minimum amount of time following a brake application, and if the brakes remain applied upon expiration of that set amount of time, until the application of the brakes subsequently ends.

In some implementations, rotation or other movement of radar reflector 490 can additionally be triggered when hazard lights of the host vehicle are activated. In some such implementations, the rotation or other movement can begin when the hazard lights are activated, and continue until the hazard lights are deactivated. In other implementations, the rotation or other movement can continue for a set amount of time following an activation of the hazard lights, even if the hazard lights are deactivated before that set amount of time has elapsed. In some implementations, the rotation or other movement can continue for at least a set minimum amount of time following an activation of the hazard lights, and if the hazard lights have not yet been deactivated when that set minimum amount of time expires, until a subsequent deactivation of the hazard lights.

In some implementations, radar reflectors can also be used to provide vehicles with indications of non-movable objects, such as guardrails, bridge support pillars, etc. In some implementations, radar reflectors of different reflectivities can be used for non-moveable objects than are used for moveable objects, and the adaptive cruise control feature of vehicle 105 can differentiate between these different types of objects based on the different reflectivities of their radar reflectors. In some implementations, non-moveable objects can be outfitted with radar reflectors that rotate at a different rate that rotating radar reflectors of moveable objects such as vehicles, and the adaptive cruise control feature of vehicle 105 can differentiate between these different types of objects based on the different rates of rotation of the radar reflectors.

Figure 5:
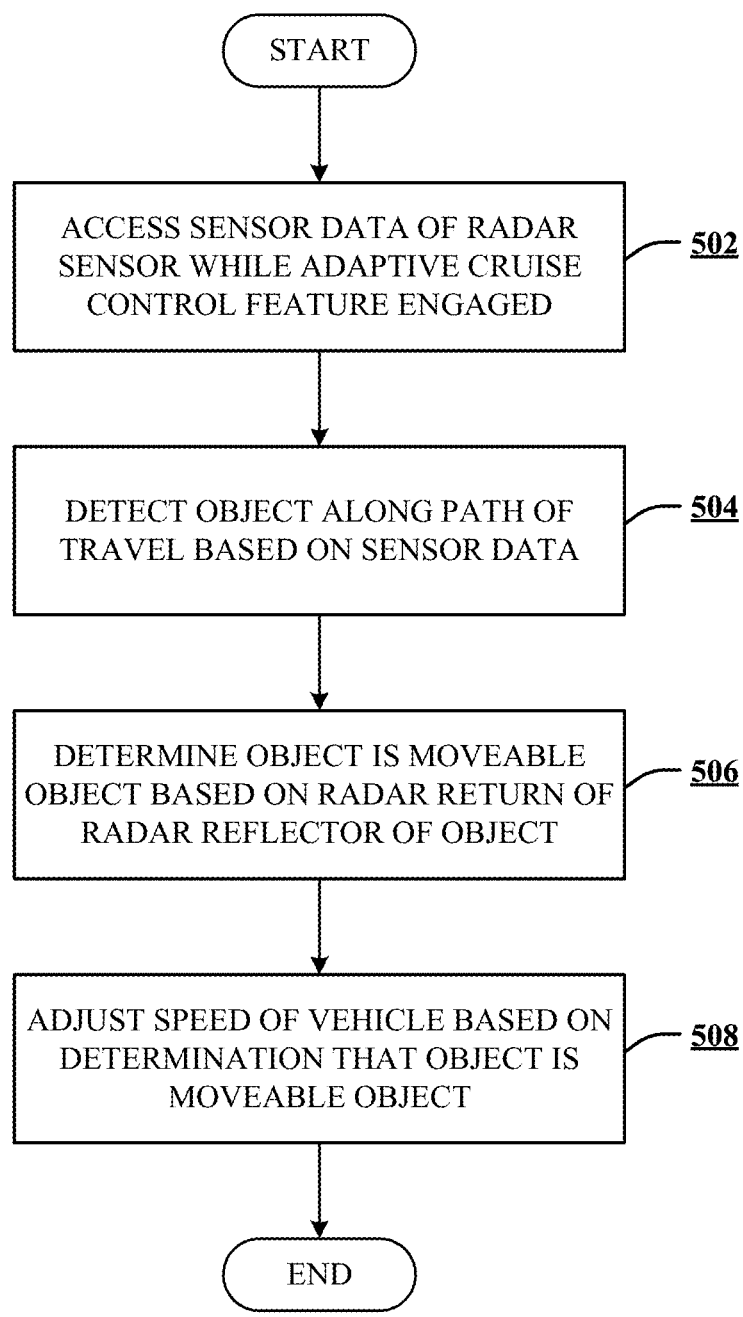
FIG. 5 is a block diagram of a second example process flow.

FIG. 5 is a block diagram of an example process flow 500 for radar recognition of stopped/slowly moving vehicles. As shown in FIG. 5, sensor data of a radar sensor of a vehicle can be accessed at 502 while an adaptive cruise control feature of the vehicle is engaged. For example, sensor data of a radar sensor of vehicle 105 can be accessed while an adaptive cruise control feature of vehicle 105 is engaged.

At 504, an object along a path of travel of the vehicle can be detected based on the sensor data. For example, vehicle 105 can detect object 486 of FIG. 4 based on sensor data of a radar sensor of vehicle 105. At 506, based on a radar return of a radar reflector of the detected object, it can be determined that the object is a moveable object. For example, based on a radar return of radar reflector 490 of FIG. 4, vehicle 105 can determine that object 486 is a moveable object. At 508, the speed of the vehicle can be adjusted based on the determination that the object is a moveable object. For example, the adaptive cruise control feature of vehicle 105 can adjust the speed of vehicle 105 based on a determination that object 486 of FIG. 4 is a moveable object.

FIG. 6 is a block diagram of an example storage medium 600. Storage medium 600 may be any non-transitory computer-readable storage medium or machine-readable storage medium, such as an optical, magnetic or semiconductor storage medium. In various implementations, storage medium 600 may be an article of manufacture. In some implementations, storage medium 600 may store computer-executable instructions, such as computer-executable instructions to implement process flow 500. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some implementations, the circuitry may be implemented in, or functions associated with the circuitry may be implemented by, one or more software or firmware modules. In some implementations, circuitry may include logic, at least partially operable in hardware.

As used herein, the adverb "substantially" means that a shape, structure, measurement, quantity, time, etc. may deviate from an exact described geometry, distance, measurement, quantity, time, etc., because of imperfections in materials, machining, manufacturing, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. The present invention is intended to be limited only by the following claims.

What is claimed is:

1. A computer having a processor and a memory, the memory storing instructions executable by the processor to:
   access sensor data of a radar sensor of a vehicle while an adaptive cruise control feature of the vehicle is active;
   detect, based on the sensor data, an object located along a path of travel of the vehicle;
   determine that the object is a moveable object based on a radar return of a radar reflector of the object; and
   responsive to the determination that the object is the moveable object, adjust, by the adaptive cruise control feature, the speed of the vehicle;
   wherein the radar reflector is configured to rotate when the object is stopped or moving below a threshold speed, and wherein determining that the object is a moveable object includes detecting rotation of the radar reflector based on the radar return and determining a rate of rotation of the radar reflector, where different rates of rotation indicate different states of the moveable object.

2. The system of claim 1, the radar reflector comprising a corner reflector.

3. The system of claim 1, the memory storing instructions executable by the processor to determine that the object is the moveable object based on a rate of the rotation of the radar reflector.

4. The system of claim 1, the memory storing instructions executable by the processor to:
   determine the reflectivity of the radar reflector based on the radar return of the radar reflector; and
   determine that the object is the moveable object based on the reflectivity of the radar reflector.

5. The system of claim 1, the memory storing instructions executable by the processor to:
   detect, based on the sensor data, a second object located along a path of travel of the vehicle; and
   determine that the second object is a non-moveable object based on a radar return of a second radar reflector of the second object.

6. The system of claim 5, the memory storing instructions executable by the processor to determine that the second object is the non-moveable object based on a reflectivity of the second radar reflector.

7. The system of claim 5, the memory storing instructions executable by the processor to:
   detect rotation of the second radar reflector based on the radar return of the second radar reflector; and
   determine that the second object is the non-moveable object based on a rate of the rotation of the second radar reflector.

8. The system of claim 1, the memory storing instructions executable by the processor to:
   detect rotation of the radar reflector based on the radar return of the radar reflector;
   determine a rate of rotation of the radar reflector; and
   determine that the moveable object is a disabled vehicle based on the rate of rotation of the radar reflector.

9. The system of claim 8, the memory storing instructions executable by the processor to cause the vehicle to execute a lane change responsive to the determining that the moveable object is the disabled vehicle.

10. Accessing sensor data of a radar sensor of a vehicle while an adaptive cruise control feature of the vehicle is active;
    detecting, based on the sensor data, an object located along a path of travel of the vehicle;

determining that the object is a moveable object based on a radar return of a radar reflector of the object; and responsive to the determination that the object is the moveable object, adjusting, by the adaptive cruise control feature, the speed of the vehicle;

wherein the radar reflector is configured to rotate when the object is stopped or moving below a threshold speed, and wherein determining that the object is a moveable object includes detecting rotation of the radar reflector based on the radar return and determining a rate of rotation of the radar reflector, where different rates of rotation indicate different states of the moveable object.

11. The method of claim 10, the radar reflector comprising a corner reflector.

12. The method of claim 10, comprising determining that the object is the moveable object based on a rate of the rotation of the radar reflector.

13. The method of claim 10, comprising:
determining the reflectivity of the radar reflector based on the radar return of the radar reflector; and
determining that the object is the moveable object based on the reflectivity of the radar reflector.

14. The method of claim 10, comprising:
detecting, based on the sensor data, a second object located along a path of travel of the vehicle; and
determining that the second object is a non-moveable object based on a radar return of a second radar reflector of the second object.

15. The method of claim 14, comprising determining that the second object is the non-moveable object based on a reflectivity of the second radar reflector.

16. The method of claim 14, comprising:
detecting rotation of the second radar reflector based on the radar return of the second radar reflector; and
determining that the second object is the non-moveable object based on a rate of the rotation of the second radar reflector.

17. The method of claim 10, comprising:
detecting rotation of the radar reflector based on the radar return of the radar reflector;
determining a rate of rotation of the radar reflector; and
determining that the moveable object is a disabled vehicle based on the rate of rotation of the radar reflector.

18. The method of claim 17, comprising causing the vehicle to execute a lane change responsive to the determining that the moveable object is the disabled vehicle.

* * * * *

UNITED STATES PATENT AND TRADEMARK OFFICE
CERTIFICATE OF CORRECTION

PATENT NO. : 12,169,238 B2
APPLICATION NO. : 17/481467
DATED : December 17, 2024
INVENTOR(S) : Xingping Chen et al.

Page 1 of 1

It is certified that error appears in the above-identified patent and that said Letters Patent is hereby corrected as shown below:

In the Claims

Column 12, Line 2, Claim 1:  Delete "A" and insert --A system, comprising: a--.

Column 12, Line 63, Claim 10:  Delete "Accessing" and insert --A method, comprising: accessing--.

Signed and Sealed this
Eleventh Day of February, 2025

Coke Morgan Stewart
*Acting Director of the United States Patent and Trademark Office*